United States Patent [19]

Fraisse et al.

[11] Patent Number: 4,761,704
[45] Date of Patent: Aug. 2, 1988

[54] SOLID-STATE TRIP DEVICE WITH TEST CIRCUIT FOR AN ELECTRICAL CIRCUIT BREAKER

[75] Inventors: Didier Fraisse, St. Martin D'Heres; Pascal Dudon, Biviers; Paul Tripodi, St. Martin D'Heres, all of France

[73] Assignee: Merlin Gerin, France

[21] Appl. No.: 945,540

[22] Filed: Dec. 23, 1986

[30] Foreign Application Priority Data

Jan. 10, 1986 [FR] France ............... 86 00415
Jan. 10, 1986 [FR] France ............... 86 00416

[51] Int. Cl.$^4$ .................................. H02H 3/08
[52] U.S. Cl. .................................. 361/50; 361/47; 361/42; 361/63; 361/93; 324/509
[58] Field of Search ............... 361/42, 47–50, 361/63, 87, 93–97; 324/51, 509, 511; 340/664

[56] References Cited

U.S. PATENT DOCUMENTS

| | | | |
|---|---|---|---|
| Re. 31,147 | 2/1983 | Helwig, Jr. et al. | 361/42 |
| 3,924,160 | 12/1975 | Maier et al. | 361/94 |
| 4,060,844 | 11/1977 | Davis et al. | 361/96 |
| 4,209,818 | 6/1980 | Zylstra et al. | 361/96 |
| 4,258,403 | 3/1981 | Shimp | 361/42 |
| 4,347,540 | 8/1982 | Gary et al. | 361/42 F |
| 4,649,455 | 3/1987 | Scott | 361/93 |

Primary Examiner—A. D. Pellinen
Assistant Examiner—Derek S. Jennings
Attorney, Agent, or Firm—Parkhurst & Oliff

[57] ABSTRACT

A test circuit simulates the operation of a multipole electrical circuit breaker, and includes a pair of auxiliary terminals connected by a connection circuit to the input terminals of a bridge rectifier cell whose output is connected in parallel with the respective outputs to two other rectifier cells associated with current transformers. A first resistor delivers a first signal proportional to the maximum intensity of the mains currents. Diodes cooperate with a second measuring resistor of a residual earth leakage current discriminator. Reversing the direction of the test current flow in the test circuit is performed by simply changing the polarity of the test terminals, and enables overcurrent protection and earth leakage protection of the electronic trip device to be checked separately.

10 Claims, 6 Drawing Sheets

Balanced three-phase 50 Hz system (iN=0) without test

Unbalanced three-phase 50 Hz + neutral system without test

SOLID-STATE TRIP DEVICE WITH TEST CIRCUIT FOR AN ELECTRICAL CIRCUIT BREAKER

BACKGROUND OF THE INVENTION

The invention relates to a solid-state trip device for a multipole electrical circuit breaker with an operating mechanism of a separable contact system, comprising:

a measuring device having a current sensor per pole to detect the intensity of the current flowing in each active conductor of the alternating current system, and rectifying means, electrically connected with said sensor to deliver a first rectified control signal, proportional to the maximum intensity of the currents of the system.

a first electronic processing circuit of said first control signal, comprising at least one delayed or instantaneous trip circuit capable of sending with or without a time delay a tripping order to a solid-state switching device when said signal exceeds a predetermined threshold, a trip coil electromagnet controlled by said switching device and acting on the mechanism, after the tripping order has been emitted, to open the separable contact system, and a test circuit with auxiliary terminals which can be connected to a fault simulator designed to apply an artificial fault current to monitor operation of the solid-state trip device.

The use of a test circuit in an electronic circuit breaker is well-known in the art, and enables operation of the trip device to be tested by applying an artificial fault current which simulates an overload or short-circuit current. The intensity of this current is generally greater than the tripping threshold of the long or short time delay trip circuit. A first test possibility is carried out when the circuit breaker is disconnected from the mains, and the electronic trip device is supplied and the artificial fault current applied by connecting the fault simulator to the test terminals. Opening of the circuit breaker contacts, following a test, informs the operator that the electronic trip device is in proper working order.

A second test possibility is when the circuit breaker is in service connected to the mains to be monitored. U.S. Pat. No. 3,924,160 refers to a test circuit of a three-phase circuit breaker enabling a D.C. test current to be applied in parallel to a diode whose anode is connected to the positive output terminal of a rectifier bridge associated with one of the current transformers. The three rectifier bridges are connected in series and the electronic processing circuit is sensitive to the strongest current:

if the intensity of the phase current delivered by the current transformers is greater than the test current, the test circuit diode is forward biased, and the processing circuit receives the phase current only;

if the test current is greater than the phase current, the test circuit diode is reverse biased and the processing circuit responds to the test current only.

A test circuit of this kind enables the processing circuit to be adapted to the strongest current, the test then being independent from the phase current intensities. Operation of the trip device is not hindered by short-circuiting of the test terminals. The problem arising from this device is the polarization of the test terminals. It is in fact absolutely necessary that the diode anode be connected to the simulator negative pole, and the cathode to the simulator positive pole. An error in connecting the simulator causes the polarity to be reversed, leading to destruction of the diode and the electronic processing circuit.

U.S. Pat. No. 4,060,844 refers to a solid-state trip device for a three-phase circuit breaker comprising a measuring circuit with current transformers cooperating with two parallel rectifier bridges. A diode test circuit is connected in parallel on the D.C. side of the rectifier bridges, the test diode anode being connected to the simulator positive pole, and the cathode to the positive output terminal of the rectifier bridges. The negative output terminal of the bridges is connected to the simulator negative pole. A trip device of this kind is insensitive to short-circuiting of the test terminals, but the test still remains polarized giving rise to the above-mentioned drawbacks.

The object of the invention is to improve the reliability and safety of test circuits built into solid-state trip devices, independent from the mains configuration.

SUMMARY OF THE INVENTION

According to a preferred embodiment, the trip device according to the invention has an internal connection circuit providing the link between the auxiliary terminals of the test circuit and the input of the rectifier cell having a diode rectifier bridge, whose output is electrically connected in parallel with the respective outputs of the other rectifier cell bridges associated with the current sensors.

The diodes of the rectifier bridge cells are divided into a plurality of identical groups electrically connected in parallel between the positive output terminal and the negative output terminal of the measuring device, each group comprising a pair of series-mounted diodes, whose mid-point is connected respectively to one of the ends of the secondary winding of the current transformers, to the first auxiliary terminal of the test circuit, and to the second auxiliary terminal of the test circuit.

It can be noted that the test circuit associated with the simulator behaves as a current generator connected on the A.C. side of a rectifier cell. Such an assembly presents the following advantages:

in addition to the trip device electronic processing circuit, the test circuit checks the status of the rectifier cell diodes associated with the test terminals, the trip device is insensitive to accidental or deliberate short-circuiting of the test terminals when the circuit breaker is in service, testing is independent from the nature of the test current: D.C. or A.C. current of any frequency, testing is not polarized in the case of a D.C. test current and allows the polarity on the test terminals to be reversed, testing is independent from the mains configuration (balanced or unbalanced) when the circuit breaker is in service. In this case, the test current is always supplemental to the rectified current from the current transformers.

The first terminal of the test circuit is advantageously connected to a common conductor interconnecting the current transformer secondary windings.

The positive output terminal of the measuring device is connected on the one hand to a first measuring resistor having a value which is either fixed or adjustable according to the rating, and on the other hand to the cathode of two diodes whose anode is connected respectively by the connection circuit to the first terminal and the second terminal of the test circuit, the latter being electrically connected on the A.C. side of a rectifier cell.

According to an alternative embodiment, applied to an earth leakage circuit breaker, the trip device comprises in addition a residual earth leakage current discriminator electrically connected between a first terminal of the test circuit and the input of the measuring device diode rectifier bridge, the other input of said bridge being connected to a second terminal of the test circuit. One-way conduction means cooperate with said discriminator DDR in such a way that reversing the direction of the test current flow in the test circuit enables operation of the first and second electronic processing circuits of the first and second signals, relating to overcurrent protection and trip device earth leakage protection, to be checked separately.

Testing is carried out in the connected or disconnected position of the circuit breaker by means of a simulator having a direct or rectified current source. The direction of the test current flow is reversed by simply changing the polarity of the first and second terminals of the test circuit. Earth leakage protection testing is made possible for a given direction of the test current flowing through a zero sequence resistor of the discriminator. Overcurrent protection is tested with the test current flowing in the opposite direction, using the same test terminals.

BRIEF DESCRIPTION OF THE DRAWINGS

Other advantages and characteristics will become more clearly apparent from the following description of an embodiment of the invention, given as an example only, and represented in the accompanying drawings, in which.

DESCRIPTION OF THE PREFERRED EMBODIMENTS

Figure 1:
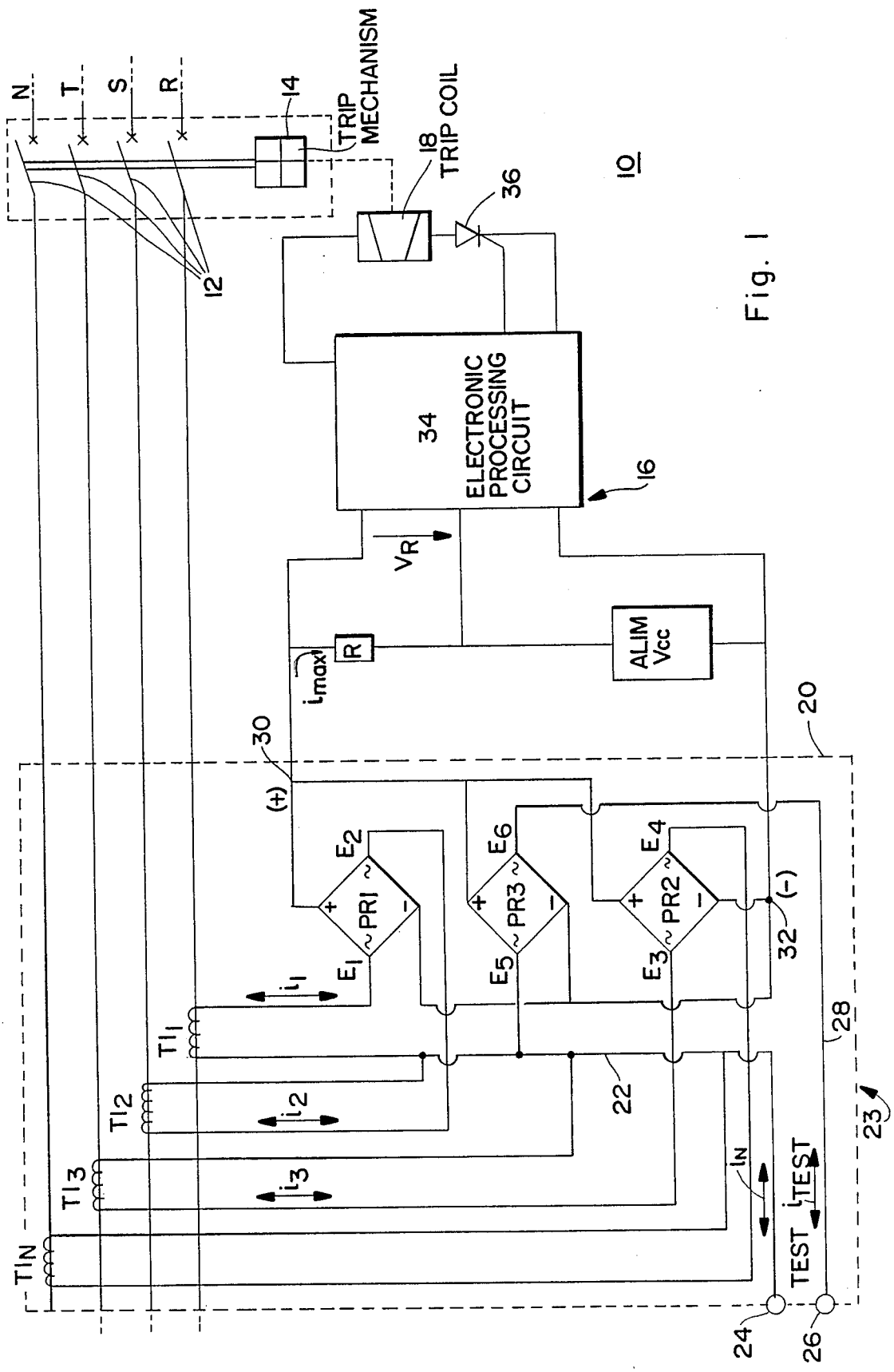
FIG. 1 shows a diagram of the electronic trip device of a three-phase plus neutral circuit breaker, equipped with the test circuit according to the invention.

Referring now to FIG. 1, a multipole electrical circuit breaker 10, notably four-pole, comprises a system of separable contacts 12 respectively connected with active conductors R, S, T, N, of a three-phase plus neutral alternating current system. The movable contacts of the contact system 12 are actuated by an operating mechanism 14 controlled by an electronic trip device 16 having an electromagnet trip coil 18. The trip coil 18 is excited when an overload or short-circuit occurs and causes the mechanism 14 to be unlocked bringing about simultaneous separation of the contact system 12 to open the circuit breaker 10.

The electronic trip device 16 comprises a measuring or detection device 20 by means of current transformers TI1, TI2, TI3, and TIN, designed to monitor the intensity of the current flowing in each active conductor R, S, T, N. The primary winding of each current transformer TI1, TI2, TI3, TIN, is formed by the corresponding active conductor R, S, T, N, which can pass directly through the magnetic circuit in the case of large cross-section bars (high ratings), or be wound on the magnetic circuit to constitute one or more turns of wires or strips (low ratings). One of the ends of each secondary winding of the current transformers TI1, TI2, TI3, TIN, is electrically connected to a common conductor 22. The other ends of the two current transformers TI1 and TI2 associated with the phase conductors R and S are connected to the two A.C. inputs E1 and E2 of a first rectifier cell PR1 with four diodes arranged in a bridge. The other current transformers TI3 and TIN associated with the phase and neutral conductors T and N are connected in the same way to the two A.C. inputs E3 and E4 of a second rectifier cell PR2 having a four-diode bridge. The detection device 20 comprises in addition a test circuit 23 comprising a pair of test terminals 24, 26, capable of cooperating with an external fault simulator (not shown) designed to input an artificial fault current to monitor operation of the electronic trip device 16. The two test terminals 24, 26 are respectively connected by an internal connection circuit 28 to two A.C. inputs E5 and E6 of a third rectifier cell PR3, the terminal 24 and the input E5 being interconnected by means of the common conductor 22. The elementary outputs of the bridges of the three rectifier cells PR1, PR2, PR3, are electrically connected in parallel, in such a way that the detection device 20 comprises a common positive output 30 and a negative output 32, between which a measuring resistor R and a power supply circuit ALIM which supplies reference voltage Vcc are connected in series. An exemplary power supply circuit ALIM is disclosed in French Pat. No. 2,530,089 filed by the applicant, which corresponds to U.S. Pat. No. 4,571,659.

The current signal i max delivered by the positive output 30 of the detection device 20 flows through the measuring resistor R having a value which is either fixed or adjustable according to the rating. The control voltage VR at the terminals of the measuring resistor R is proportional to the current signal i max, and is applied to an electronic processing circuit 34 designed to send a tripping order to a solid-state changeover switch or controlled switch, notably a thyristor 36 fitted in series with the electromagnet coil 18.

The electronic processing circuit 34 comprises a first long time and short time delay trip circuit, and a second instantaneous trip circuit, capable of delivering said tripping order with or without a delay after a predetermined threshold has been exceeded. An analog trip circuit of this kind is described in detail in French Pat. No. 2,530,089 filed by the applicant, which corresponds to U.S. Pat. No. 4,571,659, but it is obvious that the invention is applicable to any other type of processing circuit, notably a digital trip device.

Figure 2:
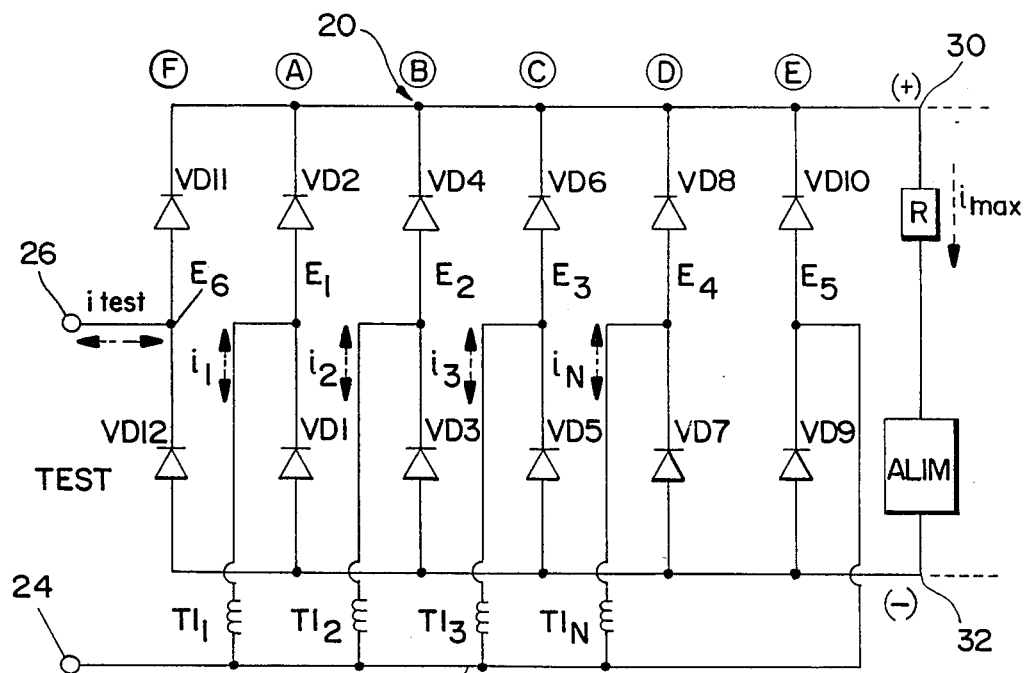
FIG. 2 shows the equivalent diagram of the measuring device in FIG. 1.

FIG. 2 illustrates the equivalent wiring diagram of the detection device 20, associated with the four-pole circuit breaker 10 in FIG. 1, the three bridge rectifier cells PR1, PR2, and PR3 comprising twelve diodes VD1 to VD12 divided into six groups A to F connected in parallel to the positive output terminal 30 and negative output terminal 32. Each group A to F comprises two diodes in series VD1, VD2; VD3, VD4; VD5, VD6; VD7, VD8; VD9, VD10; VD11, VD12, whose respective mid-point E1 to E6 is connected to the current transformers TI1, TI2, TI3, TIN, to the test terminal 24 by means of the common conductor 22 and to the other test terminal 26.

Figure 3:
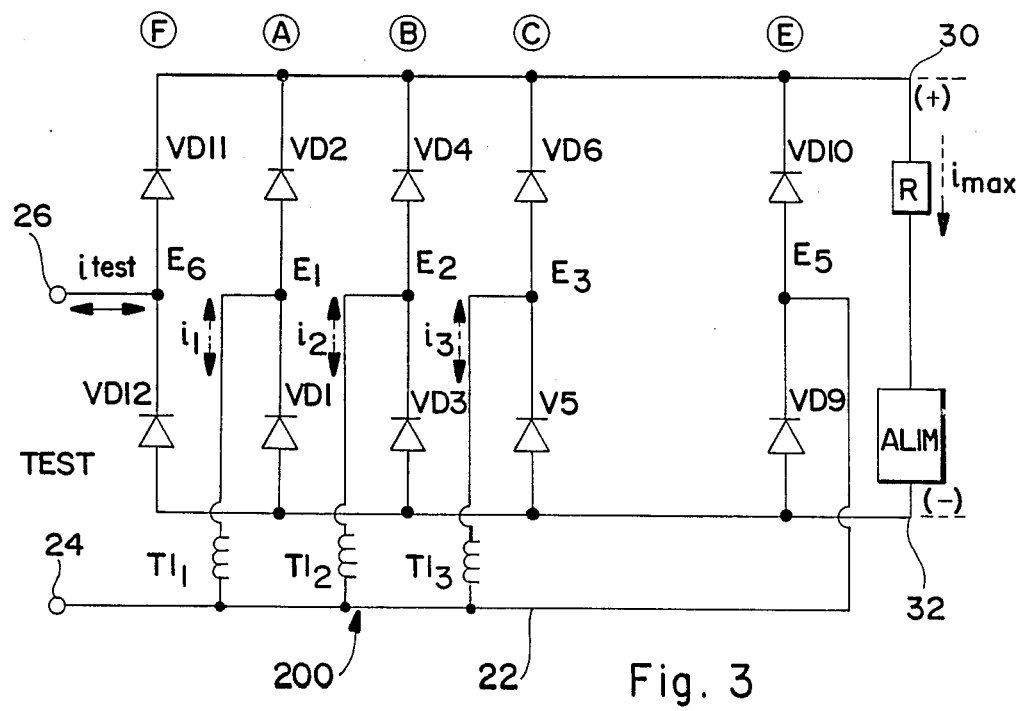
FIG. 3 is an alternative embodiment of FIG. 2, for a trip device of a three-phase circuit breaker without neutral.

The detection device 200 according to FIG. 3 is an alternative embodiment of FIG. 2 for a three-phase circuit breaker without neutral. It is sufficient in this case to remove the two diodes VD7, VD8 of group D and the current transformer TIN, the rest of the diagram being identical to that of FIG. 2.

Figure 4:
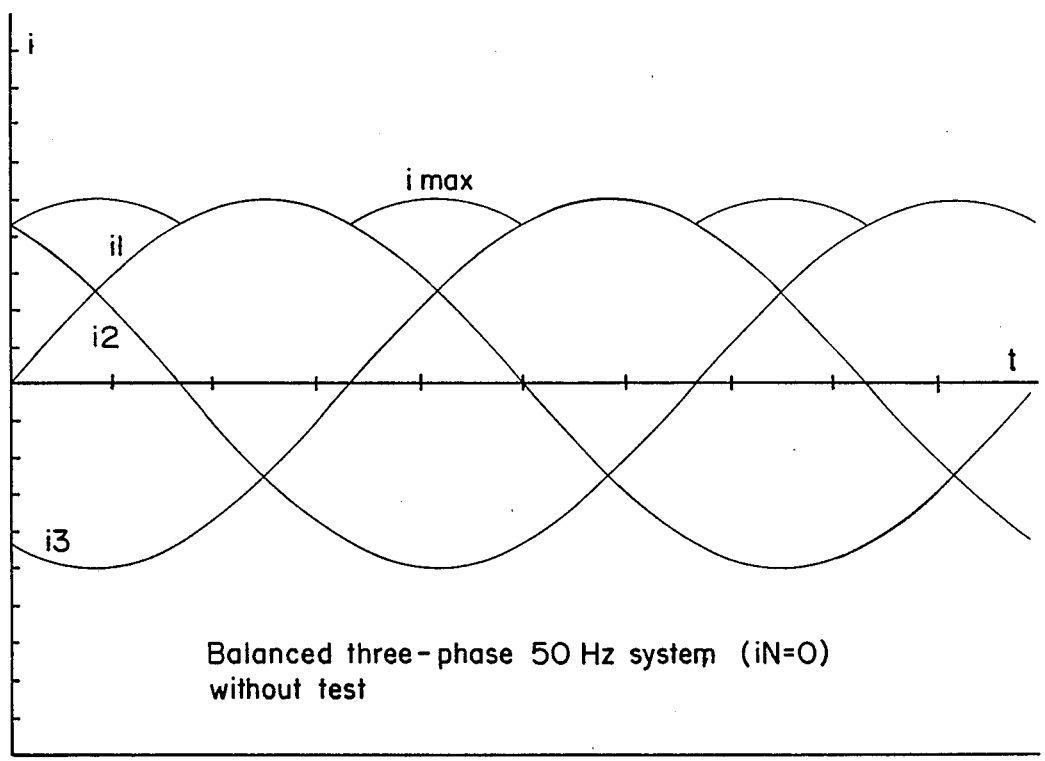
FIG. 4 represents the time diagram of the measuring device currents for a balanced three-phase mains system without neutral and without test.

When the circuit breaker 10 is connected to the mains with the contacts 12 in the closed position, operation of the detection device 20, 200 equipped with the test circuit 23 according to the invention is illustrated in the drawings in FIGS. 4 to 7:

FIG. 4 shows the time diagram of the dephased alternating currents i1, i2, i3 delivered respectively by the current transformers TI1, TI2, TI3 of the detection device 200 in FIG. 3. The three-phase system is balanced, and no test current is input via the test terminals 24, 26. The rectified current i max flowing through the measuring resistor R has a low ripple and represents the maximum of the phase currents, corresponding to the sum of the positive half-waves of the elementary currents i1, i2, i3. The diodes VD11 and VD12 always remain reverse biased.

Figure 5:
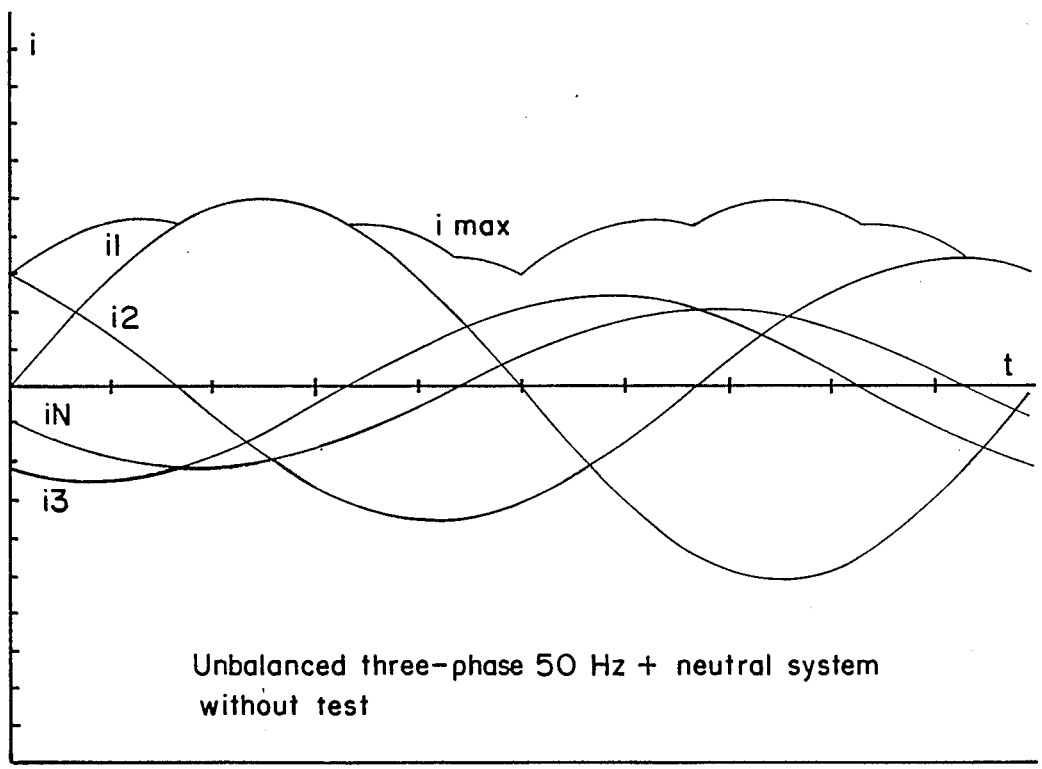
FIG. 5 represents the time diagram of the measuring device currents for an unbalanced three-phase mains system with neutral, and without test.

FIG. 5 represents the time diagram without test of the different alternating currents in the detection device 20 in FIG. 2, applied to an unbalanced three-phase system with neutral. In this case, the diodes VD11 and VD12 are always non-conducting, and the current intensity i max in the measuring resistor R corresponds at a given moment to the sum of the intensitites of the positive half-waves of the elementary currents i1, i2, i3 and iN.

Figure 6:
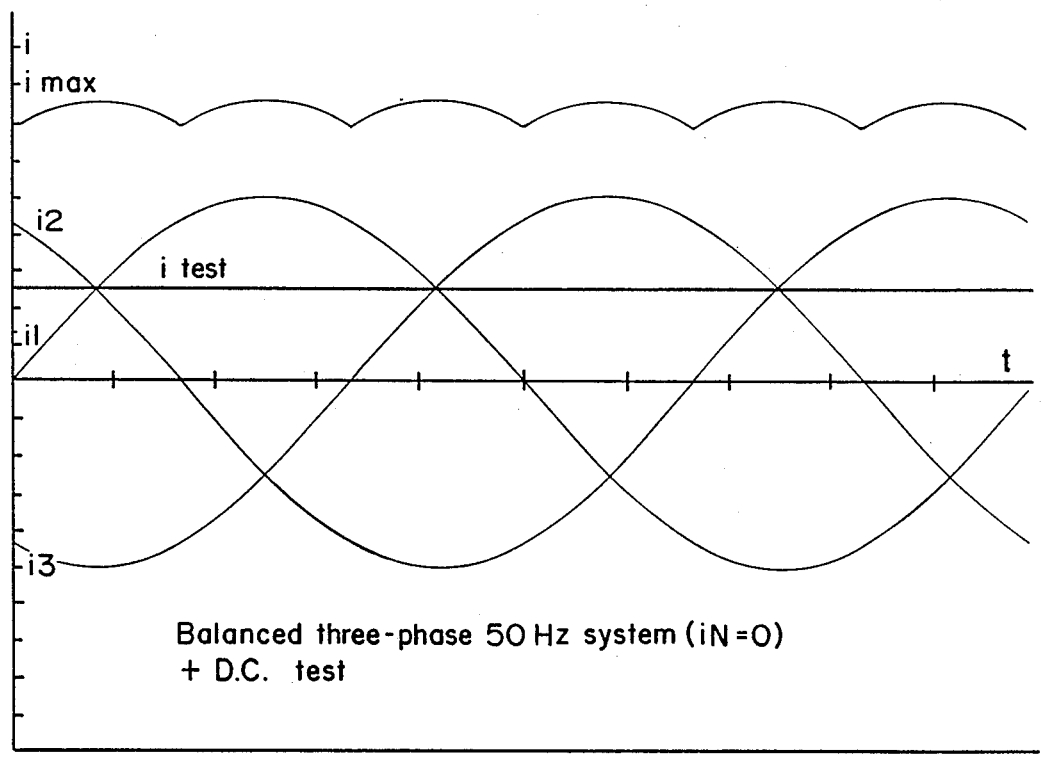
FIG. 6 corresponds to the time diagram in FIG. 4 with a direct current test.
Figure 7:
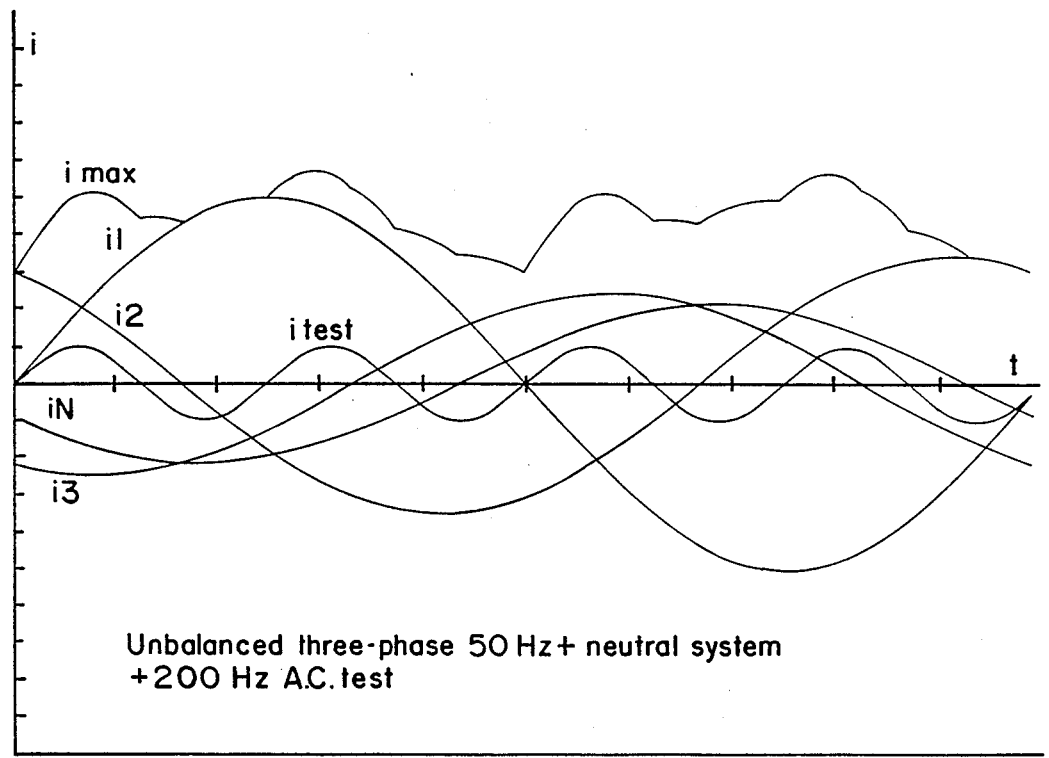
FIG. 7 corresponds to the time diagram in FIG. 5 with an alternating current test.

FIG. 6 corresponds to the time diagram in FIG. 4 (balanced three-phase 50 Hz frequency system) with a D.C. test. When the D.C. test current (i test) flows in the direction from the terminal 26 towards the input E6 (FIG. 3), the diodes VD11 and VD9 are conducting, whereas the diodes VD12 and VD10 are reverse biased. The test current (i test) is added to the phase currents flowing in the measuring resistor R, and the current i max curve is displaced upwards with respect to that of FIG. 4. When the D.C. test current (i test) flows in the direction from the terminal 24 towards the input E5 (FIG. 3), the diodes VD10 and VD12 are conducting, and the diodes VD9 and VD11 are reverse biased. The test current is still added to the phase currents flowing through the resistor R, FIG. 7 shows the time diagram in FIG. 5 (unbalanced three-phase 50 Hz system with neutral) when a test is performed with a 200 Hz alternating current applied to the test terminals 24, 26 in FIG. 2. The current i max flowing in the measuring resistor R represents the sum of the positive half-waves of the elementary current i1, i2, i3, iN, and of the A.C. test current (i test).

The test operation can be carried out at any time when the circuit breaker 10 is connected to the A.C. mains, and the test current (i test) is supplemental to the rectified currents from the current transformers TI1 to TIN. Applying the test current by means of an external simulator is assimilated to a current transformer control input, and takes place on the A.C. side of the third rectifier cell PR3 made up by the diode bridge VD9, VD10, VD11 and VD12. In addition to monitoring the processing circuit 34, the test also checks the status of the detection device 20, 200, on the A.C. side.

The test can naturally be carried out when the circuit breaker 10 is disconnected from the mains. In this case, only the D.C. or rectified test current (i test) flows through the measuring resistor R, as the elementary A.C. currents i1, i2, i3, iN, of the current transformers TI1 to TIN are zero.

Rectification with testing of the detection device 20, 200 is independent from the nature of the test current. The fault simulator can in fact apply either a D.C. current or an A.C. current of any frequency to test the satisfactory operation of the electronic trip device 16. The polarity of the D.C. supply does not matter when an A.C. test is carried out, and inverting the polarity on the test terminals 24, 26 is perfectly acceptable when connecting the simulator.

The electronic trip device 16 is insensitive to accidental short-circuiting of the test terminals 24, 26, when the circuit breaker 10 is connected to the mains.

Figure 8:
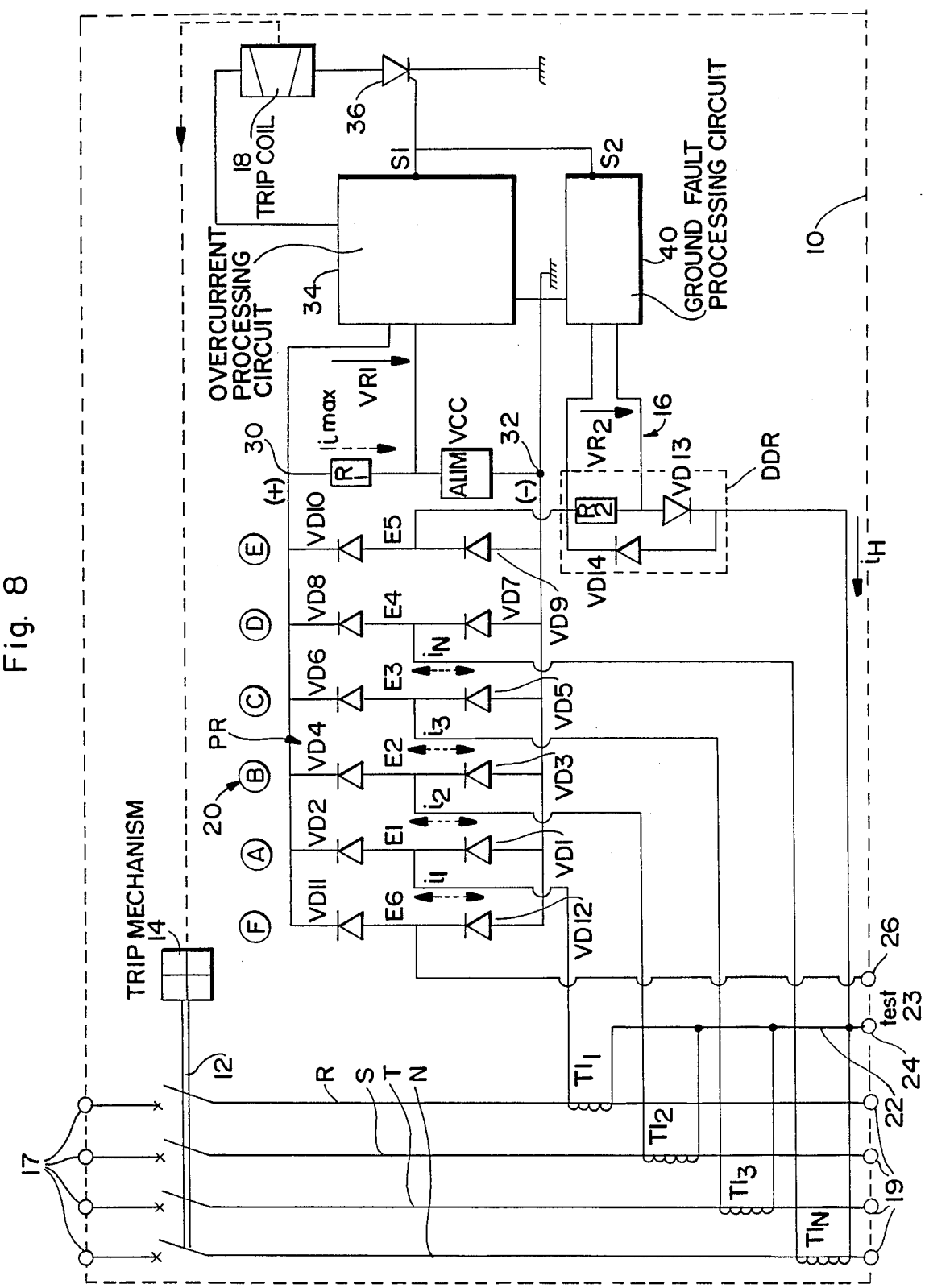
FIG. 8 shows a diagram of the electronic trip device for a three-phase plus neutral earth leakage circuit breaker, equipped with the test circuit according to the invention.
Figure 9:
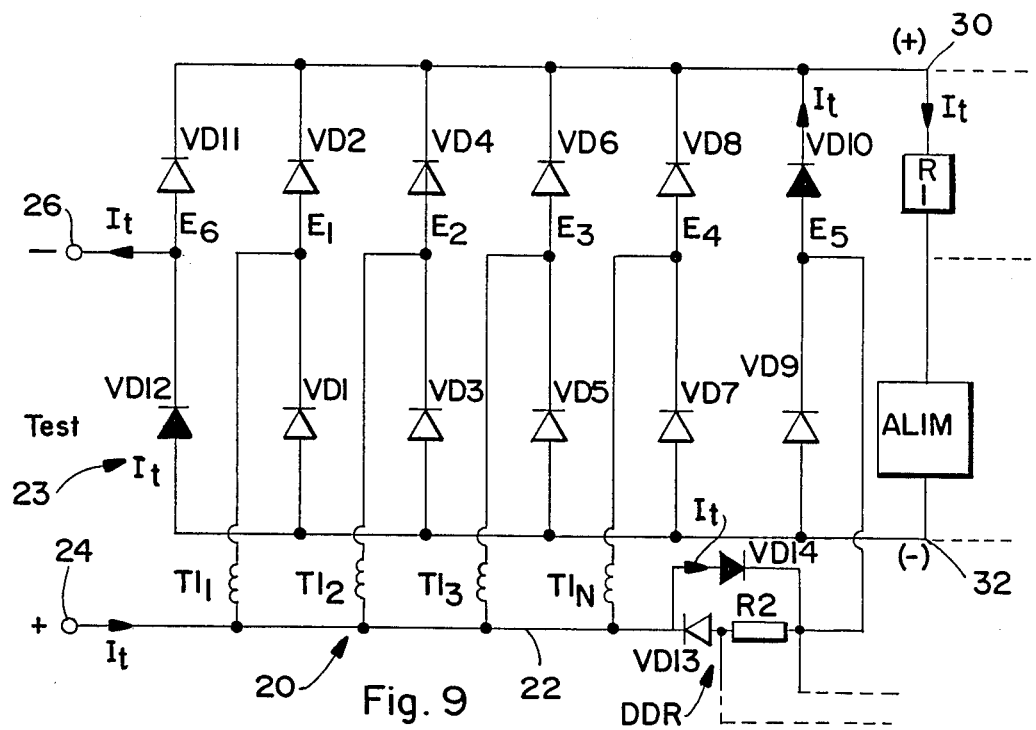
FIG. 9 represents the measuring device in FIG. 8, when an overcurrent protection test is carried out.
Figure 10:
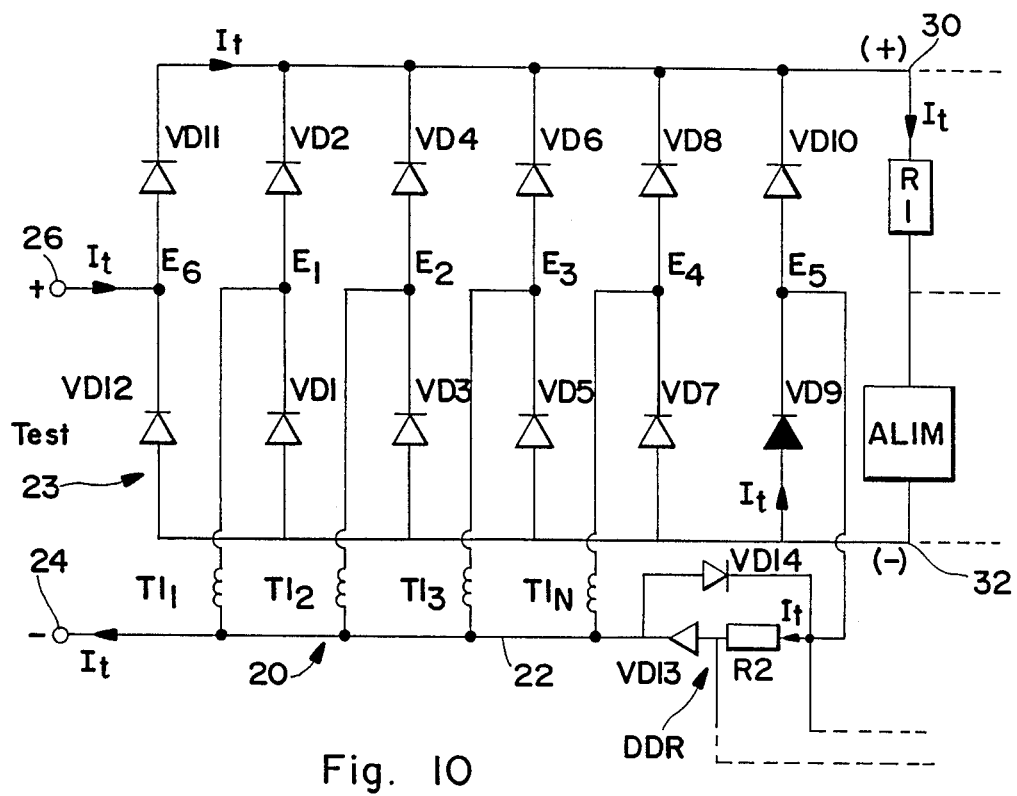
FIG. 10 is the same view as FIG. 9, for an earth leakage protection test.

According to an alternative embodiment in FIGS. 8 to 10, applied to a four-pole earth leakage circuit breaker, the same reference numbers are used to designate identical parts to those of the device in FIGS. 1 to 3. The twelve diodes (VD1 to VD12) of the rectifier device PR are divided into six identical groups (A, B, C, D, E, F) electrically connected in parallel between the positive output terminal 30 and the negative output terminal 32 of the measuring device 20. The resistor R of FIGS. 1 to 3 becomes the first measuring resistor R1, from which the first control signal, applied to the first electronic processing circuit which detects mains system overloads and short-circuits, is taken.

The trip device comprises in addition a residual earth leakage current discriminator DDR, fitted with a second measuring resistor R2 connected by one of its ends to the mid-point E5 of the group E of diodes VD9 and VD10, and by its opposite end to the anode of an auxiliary diode VD13 whose cathode is connected to the common conductor 22 and the test terminal connection 24. Another diode VD14 is reverse connected in the series circuit comprising the resistor R2 and the diode VD13. The terminals of this second measuring resistor R2 are connected to a second electronic processing circuit 40 whose output S2 controls the trigger firing the thyristor 36.

It can be noted that the thyristor 36 is common to the two electronic processing circuits 34, 40, and causes the trip coil 18 to be excited when one of the control voltage VR1, VR2 exceeds a predetermined threshold. The voltage VR1 determines the overcurrent protection whereas the voltage VR2 determines the earth leakage protection following an insulation fault.

If there are no overcurrents on the system, the value of the voltage VR1 is insufficient to actuate one of the trip circuits LR, CR and INST of the processing circuit 34. The output S1 remains inactive, and the thyristor 36 is in the blocked state.

The vector sum of the elementary currents i1, i2, i3, iN delivered by the current transformers TI1 to TIN is the image of the residual earth leakage current. If there are no insulation faults on the system, this current is zero, as is the voltage VR2 at the terminals of the second resistor R2. An insulation fault occurring between an active conductor R, S, T, N, of the system and a ground or earth causes a residual or zero sequence current iH to flow through the second resistor R2 and the diode VD13. The voltage VR2 reaches the earth leakage trip threshold of the second processing circuit 40 when the residual current intensity iH reaches a predetermined sensitivity (from 20 mA to 500 mA). Earth leakage tripping may be instantaneous or delayed after the firing order of the thryristor 36 has been emitted by the output S2.

Checking the different long time delay LR, short time delay CR, and instantaneous INST tripping functions for overcurrent protection and earth leakage tripping for insulation fault protection can be performed by means of the test circuit 23 with the incoming and outgoing terminals 17, 19 of the circuit breaker 10 either connected or disconnected. In FIGS. 9 and 10, the test operation takes place when the circuit breaker 10 is disconnected from the mains, and after the simulator has been connected up to the test terminals 24, 26. The simulator comprises an autonomous enclosure containing for example a D.C. power source, a control pushbutton, a light-emitting diode indicating device, and an output with two wires of different polarities cooperating with the test terminals 24, 26 of the electronic trip device 16.

FIG. 9 represents the test circuit 34 for overcurrent protection. The negative polarity of the simulator is applied to the test terminal 26, and the positive polarity to the test terminal 24. The direction of the D.C. test current It is indicated in the drawing, and flows from the terminal 24 through the circuit formed by the common conductor 22, the diodes VD14 and VD10, the first measuring resistor R1, and the diode VD12, and is output via the test terminal 26. The test current It flowing through the first resistor R1 enables correct operation of the electronic processing circuit 34 to be checked, notably the different long time delay LR, short time delay CR, and instantaneous INST trips. The test current intensity is greater than the image current i max corresponding to the rated current of the circuit breaker. Reverse biasing of the diode VD13 prevents the current from flowing through the second measuring resistor R2 causing blocking of the discriminator DDR, which has no current supply.

In FIG. 10, modification of the polarity of the test terminals 24, 26, causes the test current It input direction to be reversed to check operation of the circuit 40 with respect to zero sequence protection. The test terminal 26 is connected to the positive pole of the simulator, and the test terminal 24 to the negative pole. The test current It is applied via the terminal 26, and flows through the diode VD11, the first resistor R1, the diode VD9, the second resistor R2, and the diode VD13, and is output via the test terminal 24. The diode VD14 is reverse biased and the test current It flowing through the second measuring resistor R2 gives rise to the voltage VR2 enabling the earth leakage protection threshold and time delay of the circuit 40 to be tested. The test current intensity It is selected to be between the sensitivity of the earth leakage trip circuit and the image current i max corresponding to the rated current of the circuit breaker. This results in the test current flowing through the first measuring resistor R1 having no effect on the circuit 34, for the voltage VR1 remains lower than the trip threshold of the long delay LR trip circuit.

It can be noted that inverting the flow direction of the test current by simply changing the polarity of the simulator enables overcurrent protection and earth leakage protection of the trip device 16 to be tested separately with the same pair of test terminals 24, 26.

According to an alternative embodiment, the simulator comprises a non-autonomous rectified current source.

The test described in reference to FIGS. 9 and 10 can be carried out when the circuit breaker 10 is connected to the mains. The test circuit 23 according to the invention is also applicable to a trip device for a three-phase circuit breaker without neutral. The current transformer TIN and rectifiers VD7 and VD8 of the measuring device 20 then merely have to be removed.

The two diodes VD13 and VD14 associated with the second measuring resistor R2 of the discriminator DDR may naturally be replaced by other one-way conduction means capable of blocking the flow of the test current through the second resistor R2 when the circuit 34 is tested with respect to overcurrent protection.

What we claimed is:

1. A solid-state trip device for a multipole electrical circuit breaker having a separable contact system controlled by an operating mechanism, said solid-state trip device comprising:

a measuring device including a current sensor per pole for detecting intensity of current flowing in each active conductor of an alternating current system, and a plurality of current rectifying means, having respective AC inputs connected to respective current sensors, said plurality of current rectifying means having respective DC outputs which are commonly connected to provide a first rectified control signal, proportional to a maximum intensity of currents flowing in said alternating current system;

a first electronic processing circuit for processing said first control signal, comprising at least one delayed or instantaneous trip circuit capable of generating with or without a time delay a tripping order for a solid-state switching device when said first control signal exceeds a predetermined threshold;

a trip coil electromagnet controlled by said switching device for activating said operating mechanism after the tripping order has been generated, to open the separable contact system;

a test circuit having first and second test terminals which are connectable to a fault simulator designed to apply an artificial fault current to monitor operation of the solid-state trip device, when the circuit breaker is either connected with or disconnected from the active conductors of the alternating current system; and an internal connection circuit for connecting the first and second test terminals of the test circuit with an AC input of a rectifier cell having current rectifying means, said rectifier cell having a DC output connected to said DC outputs of said plurality of current rectifying means connected to said current sensors.

2. A solid-state trip device according to claim 1, wherein each current sensor comprises a current transformer having a secondary measuring winding having first and second ends, which generates an elementary alternating current constituting an image of current intensity flowing in a respective active conductor of the alternating current system, and wherein the current rectifying means each comprise diodes configured as a bridge rectifier, said diodes being divided into a plurality of identical groups of diodes electrically connected in parallel between a positive output terminal and a negative output terminal of the measuring device, each group of diodes comprising a pair of series connected diodes, each having respective mid-points connected to a first end of a respective one of said secondary measuring winding of each said current transformer, said first test terminal of the test circuit, and said second test terminal of the test circuit.

3. A solid-state trip device according to claim 2, wherein said second end of each secondary winding of each current transformer is connected to the first terminal of the test circuit.

4. A solid-state trip device according to claim 2, wherein said current rectifying means of said current sensors and said rectifier cell together comprise twelve diodes divided into six groups, each group comprising two series-connected diodes.

5. A solid-state trip device according to claim 2, wherein the current rectifying means of said current sensors and said rectifier cell together comprise 10 diodes divided into five groups, each group comprising two series-connected diodes.

6. A solid-state trip device according to claim 2, wherein the positive output terminal of the measuring device is connected to a first measuring resistor having a value which is either fixed or adjustable according to a rating of the solid-state trip device, and is connected to cathodes of a first and second diode, said first diode having an anode connected to the first terminal of the test circuit, and said second diode having an anode connected to the second terminal of test circuit.

7. A solid-state trip device according to claim 1, further comprising:
a residual ground leakage current discriminator electrically connected between a first terminal of the test circuit and said AC input of said rectifier cell, said residual ground leakage current discriminator including a second measuring resistor cooperating with first and second auxiliary diodes together generating a second control signal indicative of residual ground leakage current flowing in said alternating current system; and
a second electronic processing circuit for processing said second control signal, and for generating a tripping order for said solid-state switching device when said second control signal exceeds a predetermined threshold;
wherein reversing a direction of test current applied to said first and second test terminals in said test circuit allows independent test operation of said first and second electronic processing circuits.

8. A solid-state switch device according to claim 7, wherein said first auxiliary diode has an anode connected to said first terminal of the test circuit, and a cathode connected to said AC input of said rectifier cell, and wherein said second measuring resistor includes a first end connected to said AC input of said rectifier cell and a second end connected to an anode of said second auxiliary diode, a cathode of said second auxiliary diode being connected to said first terminal of the test circuit;
wherein, when a test signal of a first polarity is applied to said first and second test terminals, said first auxiliary diode is forward biased and said second auxiliary diode is reverse biased, and wherein, when a test signal of a second polarity is applied between said first and second test terminals, said first auxiliary diode is forward biased and said second auxiliary diode is reverse biased.

9. A solid-state trip device according to claim 8, wherein said second control signal is a voltage measured across said second measuring resistor.

10. A solid-state trip device according to claim 7, wherein said current rectifying means of said current sensors and said rectifier cell together comprise a plurality of groups of series-connected pairs of diodes, each group having a mid-point respectively connected to respective first terminals of said current sensors, to the residual ground leakage current discriminator, and to the second test terminal, and said current sensors including respective second terminals connected to said first test terminal.

* * * * *